Aug. 2, 1949.  H. SONNTAG  2,478,019
RELEASABLE LOAD CARRIER FOR AIRCRAFT
Filed May 21, 1945  3 Sheets-Sheet 1
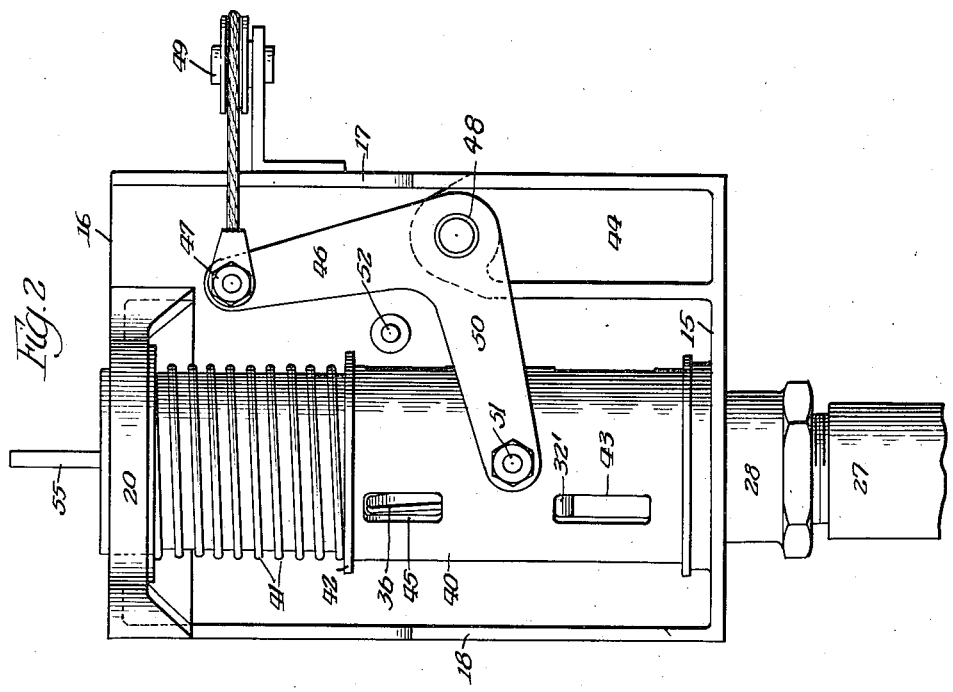
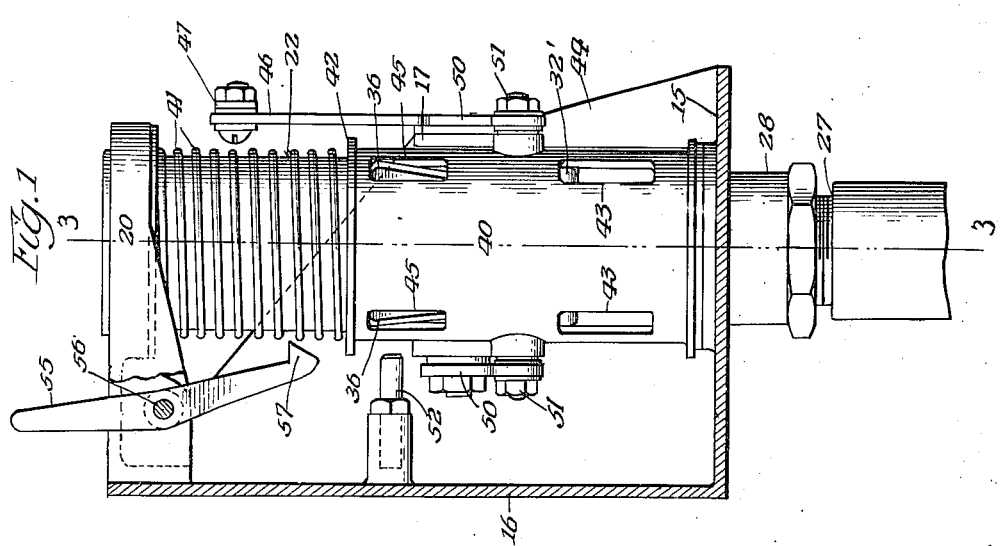
Inventor
Hermann Sonntag

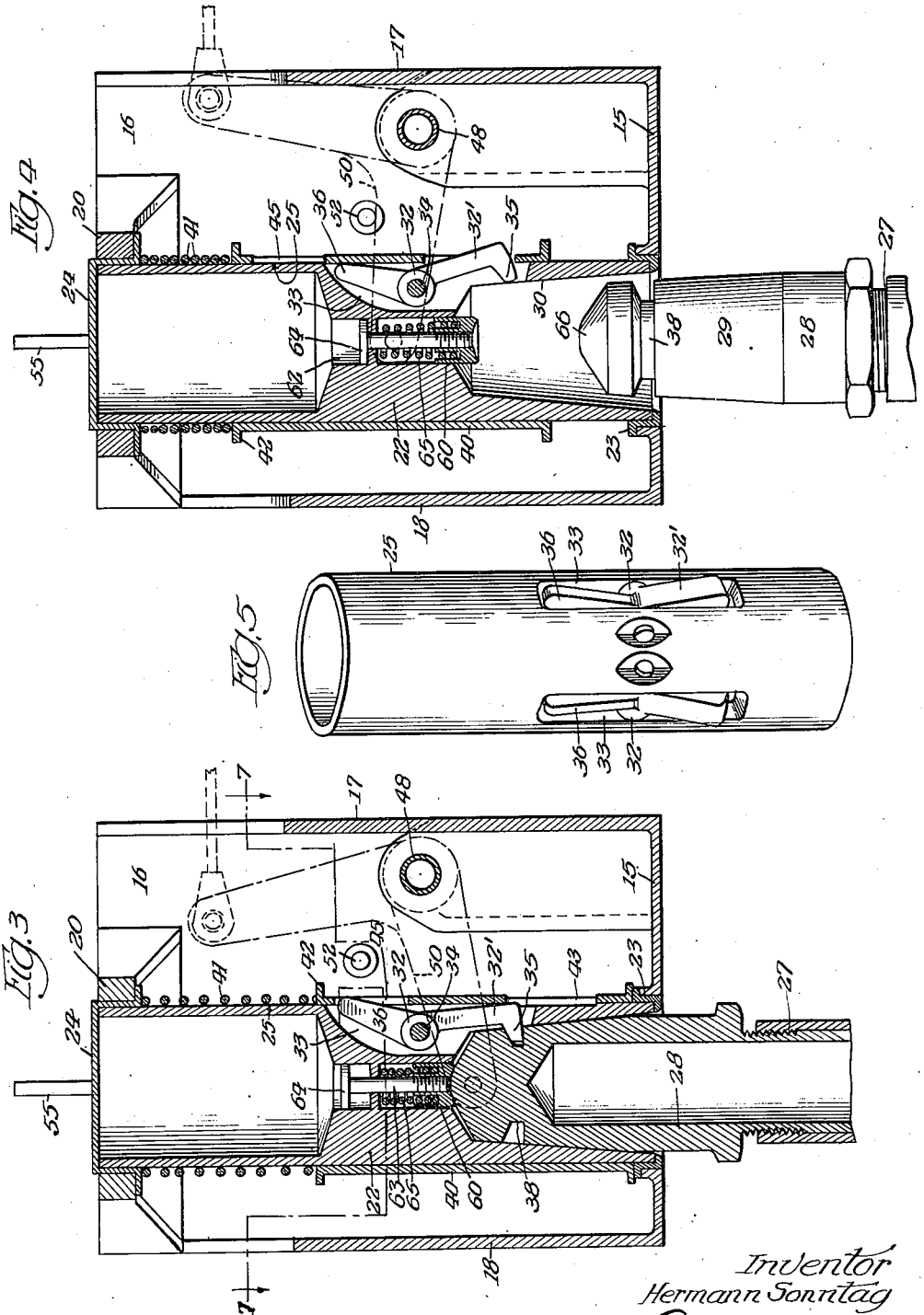

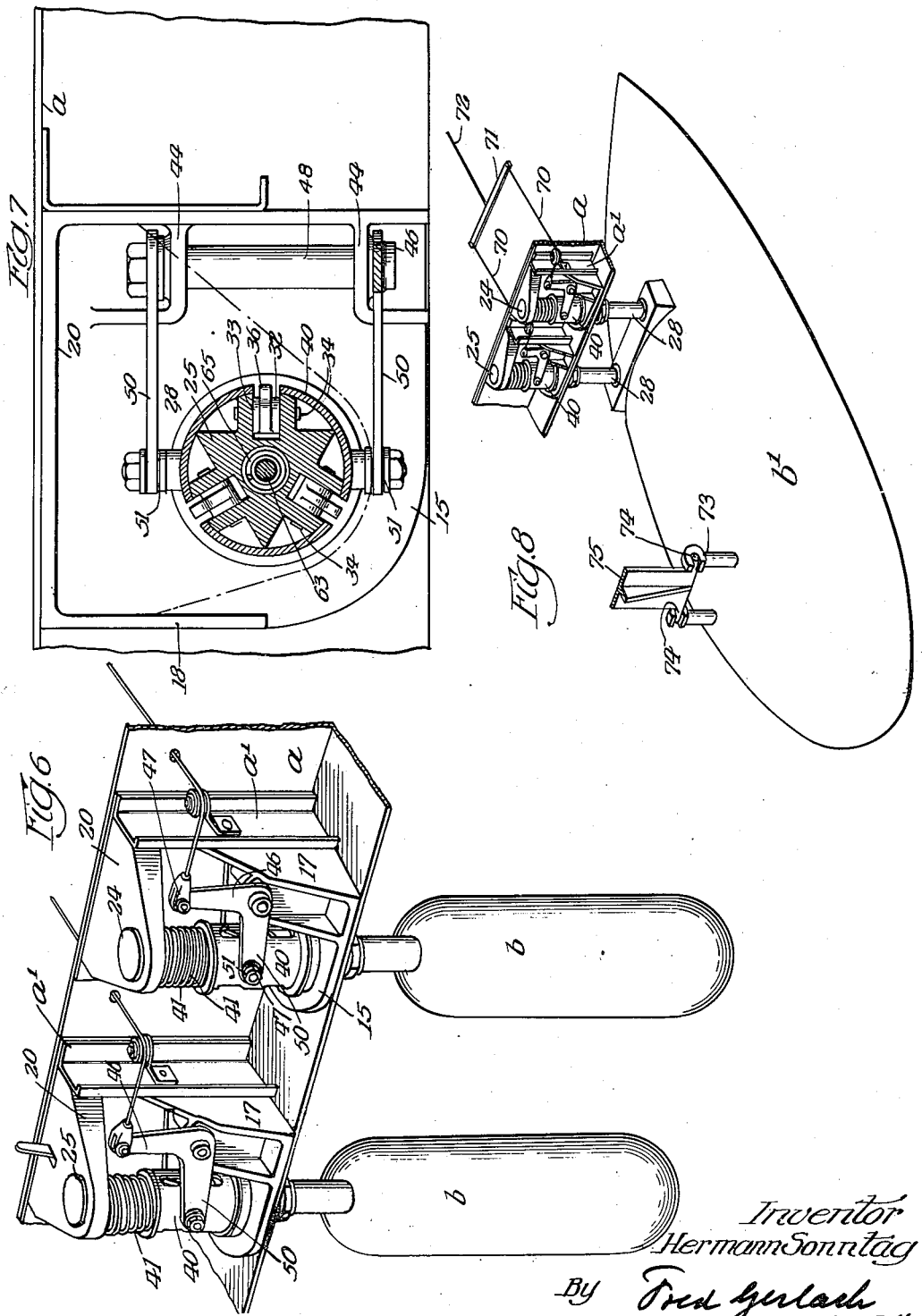

UNITED STATES PATENT OFFICE 2,478,019

RELEASABLE LOAD CARRIER FOR AIRCRAFT

Hermann Sonntag, Whittier, Calif., assignor to Consolidated Vultee Aircraft Corporation, San Diego, Calif., a corporation of Delaware Application May 21, 1945, Serial No. 594,982

2 Claims. (Cl. 294—83)

The invention relates to releasable load-carriers for use in aircraft, for dropping loads during flight.

In operation of aircraft, it is desirable to carry loads, such as fuel tanks, containers, gun units, or other jettisonable loads which are to be dropped in varying attitudes of flight and many devices heretofore devised for this purpose have been complicated in structure, or required compartments for containing the loads, or means for preventing swaying of the load, or complicated controls, all of which increased the cost of production.

One object of the invention is to provide a simple and efficient releasable load-carrier whereby the loads will be positively locked until they are released.

Another object of the invention is to provide a releasable load-carrier which locks the load so it cannot be released by shaking, and operable to release the load in different attitudes of flight.

A still further object of the invention is to provide a releasable load-carrier which locks the load with means for insuring positive ejection or dropping of the load in unusual flight attitudes.

Other objects of the invention will appear from the detailed description.

The invention consists in the several features hereinafter set forth and more particularly defined by claims at the conclusion hereof.

In the drawings:

Fig. 1 is a side elevation of the carrier, the frame being shown in section.

Fig. 2 is a front elevation of the carrier.

Fig. 3 is a vertical section taken on line 3—3 of Fig. 1 of the carrier with the stem on the load locked in the carrier.

Fig. 4 is a similar section, the stem being shown in elevation, illustrating the carrier in its load-releasing or receiving position.

Fig. 5 is a perspective view of the column.

Fig. 6 is a perspective illustrating a plurality of carriers mounted on an airplane and loads carried thereby.

Fig. 7 is a horizontal section taken on line 7—7 of Fig. 3.

Fig. 8 is a perspective illustrating a modified form of the invention.

Each releasable carrier comprises a supporting frame which includes a base 15, an integral upstanding back-wall 16, and an upper head or member 20 fixedly secured to and projecting forwardly from the upper portion of back-wall 16. These frames, in any desired number, may be mounted on any suitable part of the airplane structure from which loads are to be releasably supported and dropped. In Fig. 6 a plurality of carriers are illustrated as secured to a beam $a$ between channel-bars $a'$ as typical of mounting of the carriers. Each carrier frame and its releasable locking mechanism mounted therein form a unit, and may be conveniently attached to any suitable part of the airplane.

A columnar-body or column 22 extends vertically and is secured between the base 15 and the top frame-member 20. The lower end of column 22 is seated in a flanged thrust-ring 23 which is supported in the base 15 and its upper end is confined in an opposed flanged cap 24 which is confined in the top frame-member 20 so that the column 22 will be rigidly secured against movement in the supporting frame. The column 22 has a cylindrical periphery 25 and is provided with a co-axial upwardly convergent socket 30 in its lower end.

One end of the load, such as a fuel reservoir $b$, has connected thereto, as by a screw-thread 27, an upstanding stem 28 which is rigid with reservoir $b$, for releasable support by column 22. Stem 28 has a tapered or conoidal periphery 29 which is adapted to fit in the conical socket 30 in the lower end of column 22 so that stem 28, when it is seated in conical socket 30, will be positively positioned in column 22. Stem 28, adjacent its upper end, is provided with an annular groove 38.

The column 22 is provided with and supports mechanism for releasably locking stem 28 in socket 30. This means comprises a series of levers 32 which are mounted in longitudinal recesses 33 in the outer periphery 25 in column 22, are fulcrumed intermediate their upper and lower ends on pins 34 which are held in integral portions of the column. Each lever comprises a lower member 32' which is provided with an integral inwardly extending tooth 35 adapted to enter groove 38 in stem 28 and an arm 36 which extends upwardly from fulcrum pin 34 for shifting tooth 35 on lever 32 out of groove 38. The outer edges of members 32' and arms 36 of levers 32 are relatively inclined vertically and, when the levers are in their alternate positions, project from the cylindrical periphery 25 of column 22 for alternate and positive operation of levers 32 into locking and releasing positions. The upper edges of teeth 35 are inclined to fit the inclined upper edge of groove 38 in stem 28. When levers 32 are engaged with the stem, the outer edge of lever-members 32' extend into the recesses 33 in the outer periphery 25 of column 22 and arms 36 project from said periphery.

When arms 36 are moved inwardly to lie entirely within recesses 33, the lower members 32' will project from the periphery 25 of the column so that the levers will be positively operated to lock and release stem 28 by longitudinal sliding movement of a cylindrical sleeve 40 which has an inner cylindrical periphery which fits the periphery 25 of column 22. The cylindrical sleeve 40 for shifting levers 32 into releasing and locking positions is slidably mounted for longitudinal movement on column 22 to and from thrust-ring 23 and is normally pressed downwardly against said ring by a compression coil-spring 41 which extends around column 22 between a flange 42 on the upper end of sleeve 40 and cap 24. Sleeve 40 is provided with longitudinally extending slots 43 longitudinally aligned with levers 32, into which the lower members 32' are adapted to be spread to withdraw teeth 35 from annular groove 38 in stem 28, and with vertical extending slots 45 into which arms 36 on levers 32 extend when the sleeve 40 is longitudinally positioned to hold levers 32 engaged with groove 38 in stem 28. The portion of the inner periphery of sleeve 40 between slots 43 and 45 is adapted to cam the levers 32 into locking and releasing positions. When sleeve 40 is raised against the force of spring 41, said portion of said inner periphery will engage the outer edges of arms 36 on levers 32 which are inclined relatively to said portion of said periphery and positively swing the levers on their fulcra to move teeth 35 on members 32' of the lower ends of the levers through slots 45. When the sleeve is raised, said portion of the periphery will hold levers 32 in their releasing position. During the downward movement of sleeve 40 said portion of said periphery will engage the inclined outer edges of lever-members 32' while arms 36 are free to enter slots 43 and to positively cam teeth 35 into annular groove 38. When the sleeve is in its lowered position, the levers will be positively held in their locking position by the sleeve.

Usually it is desirable to control the release of the load from a point remote from the carrier. A bell-crank lever which comprises a shaft 48, a pair of arms 50 rigid with shaft 48, and an arm 46 is connected as at 47 to a wire or cable 49 which extends to the desired remote point of control. Shaft 48 is journalled in lugs 44 which are integrally formed with base 15 and side-web 17. Arms 50 are co-axially and pivotally connected to projecting studs 51 on sleeve 40. Spring 41 urges sleeve 40 towards its lowered position and rocks the bell-crank lever to its locking position. A pull on cable 49 rocks the bell-crank lever to raise sleeve 40 against the force of spring 41. A stop-pin 52 fixed in back-wall 16 of the frame limits the movement of the bell-crank lever in one direction.

At times it may be desirable to lock levers 32 in their raised or releasing position. For this purpose, a hand-operable latch-lever 55 is pivoted at 56 in the top 20 of the frame and is provided with a detent 57 which is adapted to extend under the flange 42 on the upper end of sleeve 40 and lock it in its raised position.

In practice, it is desirable to insure the ejection of the load-carrying stem 28 from socket 30 when the attitude of flight is such that the stem will not freely drop out of said socket. For this purpose, a plunger 60 is slidably mounted in an axial bore 62 in column 22 and is screw-threaded to a stem 63 which is slidable in the bore 62 in the column and provided at its upper end with a stop 64. A spring 65 is interposed between a wall in the upper portion of bore 62 and plunger 60. While the load-carrying stem 28 is locked by levers 32 in socket 30 in column 22, the upper conical end 66 on stem 28 will engage plunger 60 and hold spring 65 under compression. When stem 28 is unlocked, plunger 60 will be impelled by spring 65 to forcibly eject the stem 28 from socket 30.

In operation, when a load is supported in the carrier, sleeve 40 will be raised by a bell-crank lever when a pull is exerted on cable 49. The upward movement of sleeve 40 on column 22 will cause the portion of the inner periphery of sleeve 40 between slots 43 and 45 to cam arms 36 inwardly into the stem 28 as illustrated in Fig. 4, and swing lever-members 32' outwardly into slots 45. The teeth 35 of levers 32 will then be withdrawn from the tapered socket 30 in column 22. The tapered stem 28 will then be raised into engagement with said conical socket. When the pull on cable 49 is released, spring 41 will shift sleeve 40 downwardly until it is seated on thrust-ring 23. During the downward movement of sleeve 40, slots 45 will release arms 36 on levers 32 and the portion of the inner periphery of sleeve 40 above slots 43 will cam the lower members 32' of levers 32 inwardly and teeth 35 to extend into annular groove 38 in stem 28 and positively lock the stem in the column with the conical periphery of the stem fitting the conical periphery of the socket in the column. The stem and the load secured thereon will then be positively supported from and locked to the column and cannot be released by any shaking to which the load may be subjected during flight. The plunger 60, upon insertion of stem 28 in socket 30, will compress spring 65 and assist in preventing said stem from rattling in said socket.

When it is desired to drop the load during flight, the operator will pull cable 49 to operate the bell-crank lever and lift sleeve 40 against the force of spring 41. During the upward sliding movement of sleeve 40 on column 22, the inner periphery of said sleeve at the lower end of slots 45 will cam inwardly the arms 36 on the locking levers and swing lower members 32' outwardly into slots 43 in sleeve 40 and disengage teeth 35 on said levers from stem 28, whereupon the load and stem will be released and dropped. The tapered formation of stem 28 and socket 30 avoids cramping of said stem in said socket, for the free release of the load. The plunger 60 will be impelled by spring 65 to impart an initial ejection stroke to the stem 28 until there is sufficient clearance between the tapered stem and socket to permit the stem to pass freely out of the socket and the load to drop, which is advantageous when the airplane is flying in attitudes which are unfavorable to the dropping of the load.

The invention is particularly advantageous in connection with loads which are provided with a single carrying stem. In some instances, particularly when the load b' is too heavy or out of balance to be adequately carried by a single stem, a plurality of stems 28 are secured on the load and a pair of releasable carriers of the same construction are supported from the airplane structure to receive said stems. The bell-crank levers of the carriers are connected by branches 70 and an equalizer-lever 71 to a releasing cable 72, as illustrated in Fig. 8. The stems 28 are rigidly attached to the load b' at one point, and another portion of the load is suspended on the airplane structure by stems having open-sided hooks 73 which receive pins 74 fixed on a trough 75 on the airplane structure. When the plurality of stems 28 on the load are locked in the columns, the hooks 73 are locked in engagement with pins 74. When the stems 28 are released, the end portion of the load to which they are attached will drop and automatically release the hooks 73 from pins 74.

The invention exemplifies a releasable load-carrier whereby the load will be firmly locked against swaying or vibration. The invention also exemplifies a carrier which is adapted to drop the loads while the airplane is in different attitudes of flight. The invention exemplifies a carrier in which a rigid stem on the load is gripped, as in a chuck, for security during flight, and which will freely drop the load when the stem is released. A characteristic of the device is that comparatively little force is required to effect the release of the load, for example, in the construction described, a force of approximately fifteen pounds would be required in releasing a two thousand pound load. Each device is simple in construction and can be fabricated at a low cost. Each carrier is a unit which can be installed in multiple on the airplane structure, as illustrated in Fig. 6.

The invention is not to be understood as limited to the details described, since these may be modified within the scope of the appended claims without departing from the spirit and scope of the invention.

Having thus described the invention, what I claim as new and desire to secure by Letters Patent is:

1. A releasable carrier for a load provided with a rigid stem having means for interfitting engagement with locking levers, comprising: a column provided with a socket in its lower end fitting around the stem, a lever pivotally mounted in the column and provided with means for releasable interfitting engagement with the stem, a sleeve extending around the body and slidably mounted thereon, for alternately shifting the lever into locking engagement with the stem and releasing the lever for disengagement from the stem and dropping the load, a spring yieldably holding the sleeve in its lever-locking position, means for shifting the sleeve against the force of the spring to release the lever and drop the load, and a latch for locking the sleeve in its releasing position.

2. The combination with a tapered stem rigidly secured on a load adapted to be transported in suspension on aircraft and provided with an annular groove, of a columnar body, a frame rigidly secured on the aircraft and provided with upper and lower members into which the upper and lower ends of the columnar body are secured, the columnar body being provided with a tapered socket in its lower end into which the stem snugly seats for retaining the stem against axial movement in the column, levers supported in the body and provided with means for interfitting and axial interlocking engagement with the stem and adapted to fixedly hold the stem against axial movement in the socket, a sleeve, slidably mounted on the body, for shifting the levers to lock the stem against axial movement in the socket and release it to drop the load, a spring around the column for urging the sleeve to hold the levers in stem-engaging position, means carried by the frame for slidably shifting the sleeve, and means for latching the sleeve in its releasing position.

HERMANN SONNTAG.

REFERENCES CITED

The following references are of record in the file of this patent:

UNITED STATES PATENTS

| Number | Name | Date |
| --- | --- | --- |
| 526,303 | Drew | Sept. 18, 1894 |
| 603,825 | Barber | May 10, 1898 |
| 1,464,740 | Benjamin et al. | Aug. 14, 1923 |
| 1,723,717 | Audibert | Aug. 6, 1929 |
| 2,270,317 | Larson | Jan. 20, 1942 |
| 2,328,914 | Kubart | Sept. 7, 1943 |
| 2,356,920 | Drescher | Aug. 29, 1944 |
| 2,368,671 | Lombard | Feb. 6, 1945 |

FOREIGN PATENTS

| Number | Country | Date |
| --- | --- | --- |
| 10,705 | Great Britain | 1913 |
| 293,144 | Italy | Feb. 12, 1932 |